Figure 1:
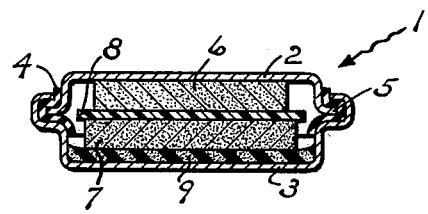

INVENTORS
ALVIN J. SALKIND
ERNEST WEISS

United States Patent Office 3,193,412
Patented July 6, 1965

3,193,412
ELECTRIC BATTERY
Alvin J. Salkind, Princeton, and Ernest Weiss, Trenton, N.J., assignors to The Electric Storage Battery Company, a corporation of New Jersey
Filed Feb. 20, 1962, Ser. No. 174,417
7 Claims. (Cl. 136—6)

The present invention generally relates to electric batteries and, while not limited thereto, it is more specifically concerned with electric batteries of the hermetically sealed type.

It is one object of the present invention to provide a new and improved means for facilitating the recombination of gases evolved during the operation of a battery with the electrochemically active material of the electrodes in order that systems of the type described may be operated in the sealed condition.

It is known in the prior art that under certain conditions batteries can be operated in a sealed container without an undue build-up of gas pressure within the container by properly proportioning the electrochemical capacities of the electrodes with respect to each other and by operating the cell with a limited amount of electrolyte, the latter being contained substantially within the pores of an absorbent separator and within the pores of the electrodes themselves. The theory of operation of a sealed cell with limited amounts of electrolyte is that by limiting the amount of electrolyte to that necessary for ion transfer between the electrodes and to that amount necessary to provide a thin film covering the electrode pore walls, to maintain them highly electrochemically active, the effective surface of the electrodes is more readily available for direct combination with the gases liberated during cell operation. In this manner, there is maintained within the cell a balanced system which provides for gas recombination at a rate which prevents an undue build-up of gas pressure within the cell.

Inasmuch as the recombination of hydrogen with the active material of the electrodes is more difficult to achieve than the recombination of oxygen, it is customary to provide the negative electrodes with a higher charging capacity than the positive electrodes to preferentially evolve oxygen on overcharging and to make available within the battery the maximum possible negative electrode surface area for oxygen recombination. To this end it has heretofore been proposed to divide the negative electrode into two or more sections having interposed therebetween spacing members of such a character that electrolyte will not be capable of adhering thereto in such quantity as to make the additional electrode surface achieved by dividing the electrode unavailable for recombination with evolved gases. It has also been proposed to space the electrodes from the cell container to provide additional electrode area for gas recombination. When such methods are utilized for providing additional electrode surface area for gas recombination, however, it has been found necessary to, in addition, maintain an intimate contact between the members of the electrode assembly in order to provide good electrical conductivity therebetween. This is generally accomplished by means of the utilization of swellable separator material, mechanical springs, and the like.

It is another object of the present invention to provide a new and improved means for making available additional electrode surface area for gas recombination, characterized by the ability to promote intimate electrical contact between electrode assembly members.

It is still another object of the present invention to provide an electrically conductive spacing member adapted to provide a liquid film environment which promotes gas recombination which will, in addition, aid in maintaining intimate contact between electrode assembly members.

It is a further object of the present invention to provide a gas permeable, conductive, electrolyte wetted resilient material for utilization between individual sections of battery electrodes and/or battery electrodes and cell containers.

In accordance with the present invention a conductive, resilient, gas permeable material is made by incorporating an electrically conductive material in a foamed rubber or other elastomer. Examples of good electrical conductors which can be incorporated in foam rubber are conductive carbon blacks and nickel flake. These conductive materials are homogeneously dispersed in a substantially continuous phase throughout a foamed rubber matrix which has a plurality of interconnected pores providing for gas transmission therethrough. Due to the gas permeable nature of the material and its pore structure, it functions with an adjacent electrode to provide an electrolyte wet but gas permeable surface which has been found to be efficient for gas recombination. By reason of the resiliency and conductivity of the foamed rubber, the matrix also acts as a conductive spring which aids in maintaining an electrode in good electrical contact with adjacent cell elements. Further, in accordance with the present invention, an electrode surface or cell container may be coated with the material or it may be coated on a supporting member such as a conductive cloth. The application of the matrix to an element may be made by dipping or by pouring and curing in situ, whichever method is more suitable to the particular application involved.

Figure 2:
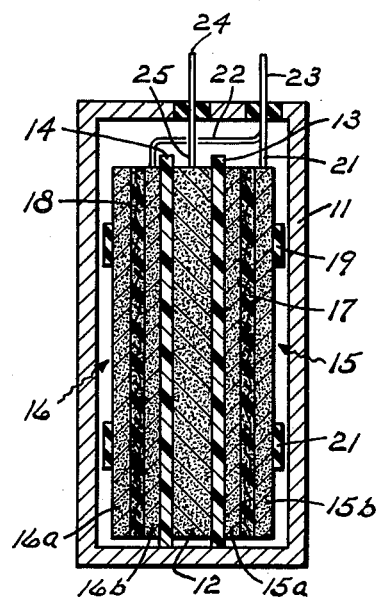

A better understanding of the present invention may be had from the following description when read with reference to the accompanying drawings of which:

FIG. 1 is a side elevation, taken in section, of a button type cell incorporating an embodiment of the present invention utilized as a spring to space an electrode from the cell container; and FIG. 2 is a side elevation, taken in section, of a flat plate type storage battery in which an embodiment of the present invention is used as a spacer between electrode sections to provide additional electrode surface area for gas recombination.

Referring now to FIG. 1, the numeral 1 generally designates a button type cell having a conductive container comprising a top 2 and a bottom 3. The top 2 and the bottom 3 of the cell container 1 are insulated from each other by an insulating grommet 4 and are held together by the crimping of the bottom 3 around the grommet 4 and a flange 5 on the top 2. As will be understood by those skilled in the art, such a construction normally provides an hermetically sealed cell container. The cell 1 contains a positive electrode 6 and a negative electrode 7 spaced from each other by a porous insulating separator 8.

The positive electrode 6 is maintained in electrical contact with the top of the cell container 2 by means of a compressive force exerted on it through the separator 8, and the negative electrode 7, by means of a resilient conductive gas permeable spacing member 9 which acts as a spring between the negative electrode 7 and the bottom of the cell container 3. In accordance with the present invention the resilient conductive spacing member 9 comprises a conductive foam rubber which as explained hereinbefore, may either be coated on the negative electrode 7, be formed as an independent unit, or poured into the bottom of the cell container 3 and cured in situ. The electrolyte for the button cell 1 is contained wholly within the pores of the positive electrode 6, the separator 8, the negative electrode 7, and if desired, the additional electrolyte may be present in the cell 1 to wet the pore surface of the conductive member 9 but should not be present in sufficient quantity to clog the pores thereof. Due to the gas permeable nature of the conductive member 9, the back face of the negative electrode 7 is exposed to gas evolved during battery operation, providing an interface between such gas, the electrode active material, and electrolyte thus providing a site for gas recombination which will eliminate the danger of an undue build-up of gas pressure within the cell 1.

By way of illustration and not by way of limitation, the following is the formulation of a conductive foam rubber which is found to be particularly suited for utilization in accordance with the teachings of the present invention. To prepare this formulation the following ingredients were mixed and foamed in a mixer to approximately 700% of their original volume:

| Ingredient: | Parts by weight (dry) |
| --- | --- |
| Styrene-butadiene copolymer latex | 70 |
| Natural rubber latex | 30 |
| Tall oil soap | 0.8 |
| Antioxidant (styrenated phenol) | 2 |
| Calcium carbonate [1] | 80 |
| Sulphur [1] | 2 |
| Zinc mercaptobenzothiazol [1] | 2 |
| Zinc diethyl dithiocarbamate [1] | 1 |
| Conductive carbon black [1] | 5 |
| Trimene Base (a condensation product of ammonia formaldehyde and ethyl chloride) | 0.75 |

[1] Added in form of aqueous dispersons.

Following the mixing and foaming of the above ingredients the following were added slowly as the foamed mixture was stirred:

| | |
| --- | --- |
| Zinc oxide | 4.0 |
| Sodium silicofluoride | 1.5 |

The conductive foam thus produced was gelled and cured in approximately ten minutes at a temperature of approximately 140° C. As will be understood by those skilled in the art of rubber chemistry, the styrene-butadiene copolymer latex and the natural rubber latex constitute the rubber components of the formulation. The proportions of the specific rubber latex specified may be varied and if desired all natural or all synthetic latex may be utilized. The tall oil soap stabilizes the latex giving it the ability to withstand violent mixing and hence foaming without coagulation. However, other soaps or surface active foaming agents may be utilized. The calcium carbonate adds stiffness to the foam and reduces the amount of rubber component needed. The sulphur acts as a vulcanizing agent for the rubber and the zinc mercaptobenzothiazol and the zinc diethyl dithiocarbamate are accelerators promoting the vulcanization reaction between the sulphur and the rubber. The zinc oxide in the formulation is an activator. The Trimene base is a sensitizer for the gelling agent which in the formulation above is sodium silicofluoride. The conductive carbon black makes the foamed rubber electrically conductive and the amount utilized may be varied to control the conductivity of the rubber. Powdered nickel, powdered silver, graphite, or some other finely divided conductive material may be utilized in the foamed rubber matrix in place of the carbon black if desired. In addition, other known rubber accelerators and activators may be utilized.

Referring now to FIG. 2, there is shown a multiple electrode flat plate type cell incorporating an embodiment of the present invention utilized as a spacer between electrode half sections to provide additional electrode surface area for gas recombination. The numeral 11 designates a cell container which is adapted to be sealed to prevent the passage of gases either from the cell to the atmosphere or from the atmosphere to the interior of the cell. In this respect it should be understood that while the resilient conductive spacing member of the present invention is particularly adapted for utilization in batteries of the type that are hermetically sealed, that it is equally adapted for use in more conventional unsealed cells. As shown, the cell container 11 contains a battery element consisting of a positive plate 12, separators 13 and 14, and a pair of composite negative electrodes 15 and 16. The negative electrode 15 comprises a pair of half sections 15A and 15B separated and in close contact with a resilient conductive gas permeable spacing member 17. Similarly, the negative electrode 16 comprises a pair of half sections 16A and 16B separated by and in close contact with another conductive resilient gas permeable member 18. The components of the electrode assembly described are held in close contact with one another by means of the bands 19 and 21. Inasmuch as the gas permeable resilient spacing members 16 and 17 are electrically conductive, the respective half sections of the composite electrodes 15 and 16 are electrically connected. As shown, the negative electrode half sections 15B and 16B are joined by conductors 21 and 22 and connected to the negative terminal of the battery 23. The positive electrode 12 is electrically connected to the positive terminal 24 by means of the conductor 25. The terminals 23 and 24 extend through the container 11 and are sealed therein. The amount of electrolyte within the battery is limited to that sufficient to provide for ionic conductivity therethrough and is solely contained in the pores of the electrode assembly.

In addition to maintaining the respective sections of the composite negative electrodes 15 and 16 in an electrically conductive relationship to each other, the gas permeable resilient spacing members 17 and 18 aid in maintaining compression on the electrode assembly to further enhance the conductivity thereof. In addition, because of its pore structure, the spacing members 17 and 18 expose the contiguous faces of the composite negative electrodes to gas generated within the cell during cell operation. In this manner there is provided additional electrode surface area for gas recombination with the active material of those electrodes. As shown, the spacing members 17 and 18 differ from the spacing member 9 shown in FIG. 1, inasmuch as the conductive foam rubber is supported on a fabric. In this respect it is not necessary that such a supporting member be provided. A fabric which has been found suitable for this purpose is a conductive graphite cloth. In this respect a spacing member of the type shown having an overall thickness of 0.049" composed of an 0.024" thick graphite cloth having a conductive coating of foam rubber applied to and cured thereon in thickness of 0.025" was found to have an electrical conductivity of 80 milliohms per sq. in. when wet in 25% potassium hydroxide solution. As will be understood by those skilled in the art, a resistivity of this order is sufficiently low to make the material ideally suited for the purpose described. While the conductive spacers 17 and 18 have been shown here as self-supporting units, by virtue of incorporating a fabric backing, it should be understood that where desirable the conductive foam can be spread directly on an electrode or cell container surface and cured in situ.

In accordance with the teachings of the present invention there has been provided a spacing means for batteries which can eliminate the necessity for mechanical spacers and yet provide both electrical conductivity and a compressive force on the electrode structure. In addition, because of its interconnected pore structure, the spacer provides additional gas electrode interface area and in that manner aids in providing the geometry necessary to promote efficient gas recombination, thereby simplifying the problem of hermetic sealing batteries. As noted hereinabove, the concept of the present invention is not necessarily limited to sealed batteries, inasmuch as the gas permeable electrically conductive resilient member may be applied to an electrode or cell container by dipping, pouring, spreading, and the like and also functions as a cell assembly aid which will eliminate the handling of the mechanical spring members common in the prior art.

Having described the present invention, that which is claimed as new is:

1. A battery comprising a container, at least one positive electrode in said container, at least one negative electrode in said container, said positive and negative electrodes being separated by a porous, insulating separator member, and a resilient, gas permeable, electrically conductive, foam rubber spacing member in contact with one of said electrodes, said foam rubber spacing member having a plurality of interconnected pores and a finely divided conductive material dispersed in a substantially continuous phase therethrough, and said spacing member being compressed so as to provide a compressive force upon said electrodes and separator.

2. A battery in accordance with claim 1 in which said spacing member spaces the negative electrode from the cell container.

3. A battery in accordance with claim 1 in which at least one of said electrodes is a composite electrode and said spacing member separates adjacent sections of said composite electrode.

4. A battery in accordance with claim 1 in which said finely divided conductive material is selected from the group consisting of nickel, silver, graphite and conductive carbon black.

5. A battery in accordance with claim 1 in which said foam rubber spacing member is prepared from a composition consisting essentially of about 100 parts by weight of a latex selected from the group consisting of styrene-butadiene copolymer latex, natural rubber latex and mixtures thereof, about 0.8 part by weight of a surface active foaming agent, about 2 parts by weight of an antioxidant, about 80 parts by weight of calcium carbonate, about 2 parts by weight of sulfur, about 3 parts by weight of an accelerator, about 0.75 part by weight of a sensitizer, about 1.5 parts by weight of sodium silicofluoride, about 4 parts by weight of zinc oxide, and about 5 parts by weight of a conductive carbon black.

6. A battery in accordance with claim 2 in which said cell container is hermetically sealed.

7. A battery in accordance with claim 5 in which said electrically conductive foam rubber is coated on an electrically conductive fabric backing.

References Cited by the Examiner
UNITED STATES PATENTS

| | | | |
|---|---|---|---|
| 2,597,741 | 5/52 | Macey | 252—511 |
| 2,778,754 | 1/57 | Shorr | 136—111 |
| 2,925,396 | 2/60 | Pearson et al. | 260—2.5 |
| 2,980,745 | 4/61 | Peters | 136—6 |
| 3,003,975 | 10/61 | Louis | 252—513 |
| 3,057,943 | 10/62 | Strauss | 136—6 |
| 3,072,558 | 1/63 | Myers et al. | 204—294 |
| 3,083,124 | 3/63 | Rahmes | 260—2.5 |

JOHN H. MACK, *Primary Examiner*.